(12) United States Patent
Rubio Corredera

(10) Patent No.: US 10,667,115 B2
(45) Date of Patent: May 26, 2020

(54) INTEGRATED WIRELESS BEACON IN FIRE ALARM DEVICES FOR INDOOR LOCALIZATION

(71) Applicant: Autronica Fire & Security AS, Trondheim (NO)

(72) Inventor: Carlos Rubio Corredera, Trondheim (NO)

(73) Assignee: AUTRONICA FIRE & SECURITY AS, Trondheim (NO)

( * ) Notice: Subject to any disclaimer, the term of this patent is extended or adjusted under 35 U.S.C. 154(b) by 0 days.

(21) Appl. No.: 16/229,407

(22) Filed: Dec. 21, 2018

(65) Prior Publication Data
US 2019/0200206 A1 Jun. 27, 2019

Related U.S. Application Data

(60) Provisional application No. 62/608,842, filed on Dec. 21, 2017.

(51) Int. Cl.
 *H04W 4/90* (2018.01)
 *H04W 4/80* (2018.01)
 (Continued)

(52) U.S. Cl.
 CPC .............. *H04W 4/90* (2018.02); *G08B 7/066* (2013.01); *G08B 17/00* (2013.01); *G08B 19/00* (2013.01); *G08B 27/006* (2013.01); *H04W 4/025* (2013.01); *H04W 4/33* (2018.02); *H04W 4/80* (2018.02); *H04W 40/244* (2013.01); *H04W 64/003* (2013.01)

(58) Field of Classification Search
 CPC .... G08B 19/00; G08B 15/02; G08B 13/1609; G08B 21/02; G08B 17/00; G08B 7/066; G08B 27/006; H04W 4/33; H04W 4/80; H04W 4/90
 USPC ...... 340/12.23, 521, 573.1, 505, 539.11, 532
 See application file for complete search history.

(56) References Cited

U.S. PATENT DOCUMENTS 4,001,819 A * 1/1977 Wise ...................... G08B 19/00
 340/521
6,124,796 A 9/2000 Hincher
(Continued)

FOREIGN PATENT DOCUMENTS

EP 2963626 A1 1/2016
EP 2983145 A1 2/2016
(Continued)

OTHER PUBLICATIONS

Extended European Search Report for application 18215192.8, dated May 6, 2019, 8 pages.
(Continued)

*Primary Examiner* — William D Cumming
(74) *Attorney, Agent, or Firm* — Cantor Colburn LLP

(57) ABSTRACT

A method and system for communicating via peer to peer messages is disclosed. A method includes advertising availability of the peripheral via wireless messaging for a first period of time; triggering a message send event; determining a destination node; connecting to the destination node via wireless messaging; sending the message to the destination node; and entering a low power state for a second period of time, wherein the second period of time is longer than the first period of time.

18 Claims, 3 Drawing Sheets

(51) Int. Cl.
*H04W 4/33* (2018.01)
*G08B 19/00* (2006.01)
*H04W 4/02* (2018.01)
*H04W 64/00* (2009.01)
*H04W 40/24* (2009.01)
*G08B 27/00* (2006.01)
*G08B 7/06* (2006.01)
*G08B 17/00* (2006.01)

(56) References Cited

U.S. PATENT DOCUMENTS

| | | | | |
|---|---|---|---|---|
| 6,967,565 B2* | 11/2005 | Lingemann | ............ | G05B 15/02 340/12.23 |
| 8,474,172 B2* | 7/2013 | Ivtsenkov | ............ | F41A 17/063 340/505 |
| 8,572,876 B2* | 11/2013 | Shekarri | ............ | F41A 17/066 42/1.08 |
| 8,760,285 B2* | 6/2014 | Billman | ............ | G08B 19/00 340/539.11 |
| 8,837,097 B2* | 9/2014 | Zuercher | ............ | H02H 7/20 361/42 |
| 8,842,397 B2* | 9/2014 | Fahrenbruch | ..... | H01L 31/02021 361/1 |
| 9,024,748 B2* | 5/2015 | Haase | ............ | G08B 13/1609 340/532 |
| 9,086,472 B2* | 7/2015 | Ivtsenkov | ............ | G01S 3/30 |
| 10,009,734 B2* | 6/2018 | Chu | ............ | H04W 4/33 |
| 10,161,616 B2* | 12/2018 | Hsia | ............ | F21V 25/04 |
| 2002/0030600 A1 | 3/2002 | Starner et al. | | |
| 2004/0267385 A1* | 12/2004 | Lingemann | ............ | G05B 15/02 700/83 |
| 2006/0009863 A1* | 1/2006 | Lingemann | ............ | G05B 15/02 700/19 |
| 2011/0156914 A1* | 6/2011 | Sheharri | ............ | F41A 17/063 340/573.1 |
| 2011/0301772 A1* | 12/2011 | Zuercher | ............ | H02H 7/20 700/293 |
| 2012/0073178 A1* | 3/2012 | Ivtsenkov | ............ | F41A 17/063 42/70.06 |
| 2012/0300347 A1* | 11/2012 | Fahrenbruch | ..... | H01L 31/02021 361/1 |
| 2013/0310081 A1 | 11/2013 | Chu | | |
| 2014/0070942 A1* | 3/2014 | Haase | ............ | G08B 21/02 340/532 |
| 2014/0085125 A1* | 3/2014 | Ivtsenkov | ............ | G01S 3/30 342/45 |
| 2014/0132409 A1* | 5/2014 | Billman | ............ | G08B 19/00 340/539.1 |
| 2014/0167959 A1 | 6/2014 | Chu | | |
| 2015/0350848 A1 | 12/2015 | Eramian | | |
| 2016/0234649 A1 | 8/2016 | Finnerty et al. | | |
| 2016/0234653 A1* | 8/2016 | Chu | ............ | H04W 4/33 |
| 2017/0230930 A1* | 8/2017 | Frey | ............ | H04W 4/80 |
| 2017/0238154 A1 | 8/2017 | Vagelos | | |
| 2017/0245116 A1* | 8/2017 | Chu | ............ | H04B 17/318 |
| 2017/0270775 A1* | 9/2017 | Haase | ............ | G08B 25/016 |
| 2017/0311131 A1 | 10/2017 | South et al. | | |
| 2018/0187877 A1* | 7/2018 | Hsia | ............ | F21V 25/04 |
| 2019/0200206 A1* | 6/2019 | Rubio Corredera | .... | H04W 4/90 |

FOREIGN PATENT DOCUMENTS

| | | |
|---|---|---|
| EP | 3217740 A1 | 9/2017 |
| GB | 2449633 A | 12/2008 |
| JP | 2016038755 A | 3/2016 |
| KR | 101750747 B1 | 7/2017 |
| KR | 101783002 B1 | 9/2017 |
| WO | 2016134976 A1 | 9/2016 |
| WO | 20161343976 A1 | 9/2016 |
| WO | 2017021223 A1 | 2/2017 |

OTHER PUBLICATIONS

Jang, S., et al., "A Dual-mode Beacon Profile for Normal and Disaster Environments", abstract, Mobile and Wireless Technologies 2016. Lecture Notes in Electrical Engineering, vol. 391., 4 pages.

* cited by examiner

INTEGRATED WIRELESS BEACON IN FIRE ALARM DEVICES FOR INDOOR LOCALIZATION

CROSS-REFERENCE TO RELATED APPLICATIONS

This application claims the benefit of U.S. provisional patent application Ser. No. 62/608,842, filed Dec. 21, 2017, the entire contents of which are incorporated herein by reference.

BACKGROUND

Exemplary embodiments pertain to the art of electronics. In particular, the present disclosure relates to indoor localization.

Localization is an increasingly popular use case of mobile electronic devices. In outdoor usage, global navigation satellite systems, such as the Global Positioning System (GPS) are used to determine the location of an electronic device. When mapping software is used in conjunction with the global navigation satellite signals, a user is able to determine his position and determine a course to a destination. However, signals from global navigation satellite systems may not operate properly in indoor locations. To determine a user's location, other systems are used.

BRIEF DESCRIPTION

According to one embodiment, a system for indoor localization is disclosed. A system includes a control panel; a plurality of devices coupled to the control panel via a low-voltage wiring loop; wherein: each device of the plurality of devices includes a beacon transmitter configured to transmit information wirelessly for indoor localization purposes; and each device of the plurality of devices is used for other building control purposes.

In addition to one or more features described above, or as an alternative, further embodiments may include wherein each device of the plurality of devices is part of a fire protection system.

In addition to features described above, or as an alternative, further embodiments may include wherein each device of the plurality of devices is chosen from one or more of the following: audio alarm, visual alarm, smoke detector, heat detector, carbon monoxide detector, pull station, and emergency lighting.

In addition to features described above, or as an alternative, further embodiments may include a power management circuit coupled to the beacon transmitter and to the low-voltage wiring loop; and a rechargeable power supply coupled to the power management circuit; wherein: the power management circuit is configured to alternate between powering the beacon transmitter and charging the rechargeable power supply using a duty cycle.

In addition to features described above, or as an alternative, further embodiments may include wherein the duty cycle comprises powering the beacon transmitter such that the beacon transmitter is capable of transmitting wireless signals, for a first period of time; and charging the rechargeable power supply for a second period of time; wherein the second period of time is longer than the first period of time.

In addition to features described above, or as an alternative, further embodiments may include wherein the information for indoor localization purposes includes unique identification information.

In addition to features described above, or as an alternative, further embodiments may include wherein the unique identification information is associated with a location of the beacon transmitter.

In addition to features described above, or as an alternative, further embodiments may include wherein the information for indoor localization purposes includes information regarding a location of the beacon transmitter.

In addition to features described above, or as an alternative, further embodiments may include wherein the beacon transmitter is configured to transmit signals using a wireless protocol chosen from the following: BLUETOOTH, WiFi, ZIGBEE, and Z-Wave.

According to one embodiment, a method for indoor localization is disclosed. A method includes receiving, at a mobile electronic device, a wireless signal from a beacon transmitter located in a fire protection system; using information in the wireless signal to determine a location of the beacon transmitter; and using the location of the beacon transmitter to estimate a location of the mobile electronic device.

In addition to features described above, or as an alternative, further embodiments may include wherein using information in the wireless signal to determine a location of the beacon transmitter comprises determining a unique identifier within the wireless signal and associating the unique identifier with a location.

In addition to features described above, or as an alternative, further embodiments may include wherein using information in the wireless signal to determine a location of the beacon transmitter comprises receiving location information within the wireless signal.

In addition to features described above, or as an alternative, further embodiments may include receiving an emergency notification from the fire protection system within the wireless signal; and determining a safe path for a user of the mobile electronic device to take based on the location of the mobile electronic device.

In addition to features described above, or as an alternative, further embodiments may include displaying a map on the mobile electronic device with an indication of the estimated location of the mobile electronic device.

In addition to features described above, or as an alternative, further embodiments may include wherein the mobile electronic device is configured to receive signals using a wireless protocol chosen from the following: BLUETOOTH, WiFi, ZIGBEE, and Z-Wave.

In addition to features described above, or as an alternative, further embodiments may include transmitting information regarding an identity of the mobile electronic device to allow tracking of the mobile electronic device.

In addition to features described above, or as an alternative, further embodiments may include receiving a notification of an emergency via the mobile electronic device; generating directions for exiting the emergency situation, using the location of the mobile electronic device; and displaying the directions via the mobile electronic device.

In addition to features described above, or as an alternative, further embodiments may include receiving advertisements via the mobile electronic device, wherein the advertisements are customized based on the location of the mobile electronic device.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

As described above, it can be difficult to determine a user's location using signals from global navigation satellite systems. To briefly describe how such systems work, a series of satellites orbit the Earth. A receiver senses signals from multiple satellites. Using timing information, the receiver can use trilateration to determine the position of the receiver based on the time it takes for each signal to reach the receiver. Thus, in order to accurately determine the position of a receiver of a global navigation satellite system, the receiver must be able to receive the signals from the global navigation satellite system.

However, in some cases, such signals can be difficult to receive indoors, due to the fact that a building's roof and the associated equipment in the building block or attenuate such signals.

In order to determine a user's location indoors, other techniques are typically used. In some cases, other electronic signals can be received and trilateration techniques can be used to determine the receiver's location relative to the transmitters of the other electronic signals. Such techniques are sometimes referred to as an indoor positioning system (IPS). A variety of electronic signals can be used to provide such beacons. Exemplary electronic signals can include BLUETOOTH, WiFi, ZIGBEE, and Z-Wave., or any wireless protocol currently in existence or developed in the future.

An issue with indoor positioning is that transmitters or beacons must be present that transmit the electronic signals used for indoor positioning. Retrofitting existing buildings such that they are able to transmit such signals can be time consuming and expensive. Not only do beacons need to be placed, they also need to be powered. It would be desirable to have a method and system that minimizes installation worries.

In one or more embodiments, devices in a fire protection loop are used to provide a location and power to wireless beacons.

Figure 1:
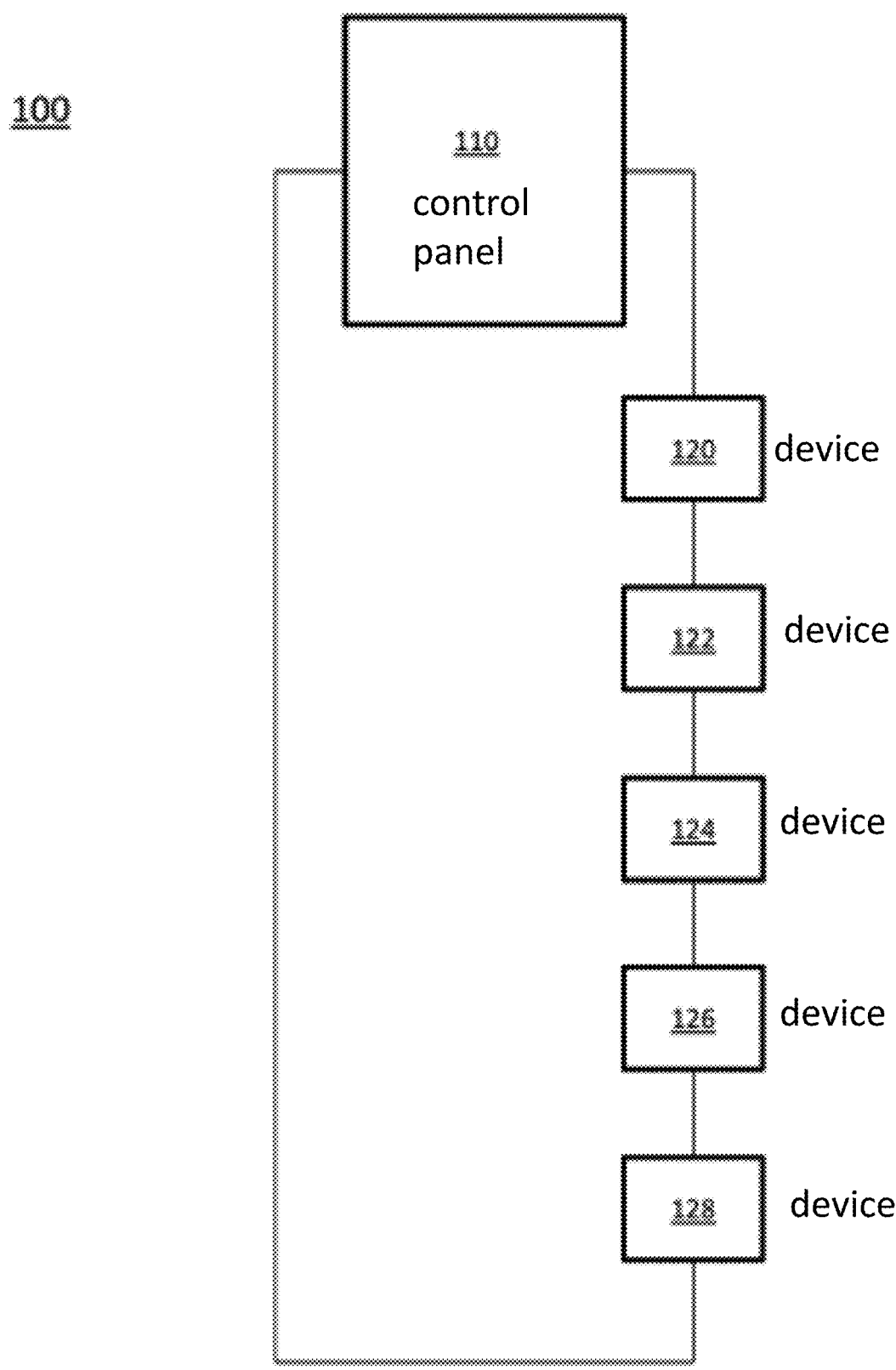
FIG. 1 is a block diagram illustrating an exemplary control loop of one or more embodiments.

A block diagram illustrating an exemplary fire protection system 100 is presented in FIG. 1. Fire protection system 100 includes a control panel 110 and a plurality of devices 120, 122, 124, 126, and 128. Devices 120, 122, 124, 126, and 128 form a loop of devices in that control panel is coupled to device 120 and device 128. Devices 122, 124, and 126 are each coupled together and coupled to device 120 and 128, such that each device is coupled to the control panel. In one exemplary embodiment, the coupling between devices 120, 122, 124, 126, and 128 is in the form or a low-power circuit. A low amount of voltage (on the order of 12 to 42 volts) is supplied by control panel 110 to each of devices 120, 122, 124, 126, and 128. While only five devices are shown in FIG. 1, it should be understood that any number of devices can be present in fire protection system 100.

Devices 120, 122, 124, 126, and 128 can be one of a variety of different devices that are typically used in a fire protection system. Exemplary devices include sirens and other audio alarms, visual alarms, emergency lighting, smoke detectors, heat detectors, carbon monoxide detectors, natural gas detectors, pull stations, and the like.

Within each of devices 120, 122, 124, 126, and 128 is placed a beacon transmitter configured to transmit wireless signals. The wireless signals can then be used for indoor localization purposes. As described above, any type of wireless signal can be used for such a purpose.

A building may have a single fire control loop (such as system 100). However, depending on the size of the building, multiple fire control loops can be present. The multiple fire control loops can be coupled together, possibly by coupling a control panel (such as control panel 100) with another control panel.

Figure 2:
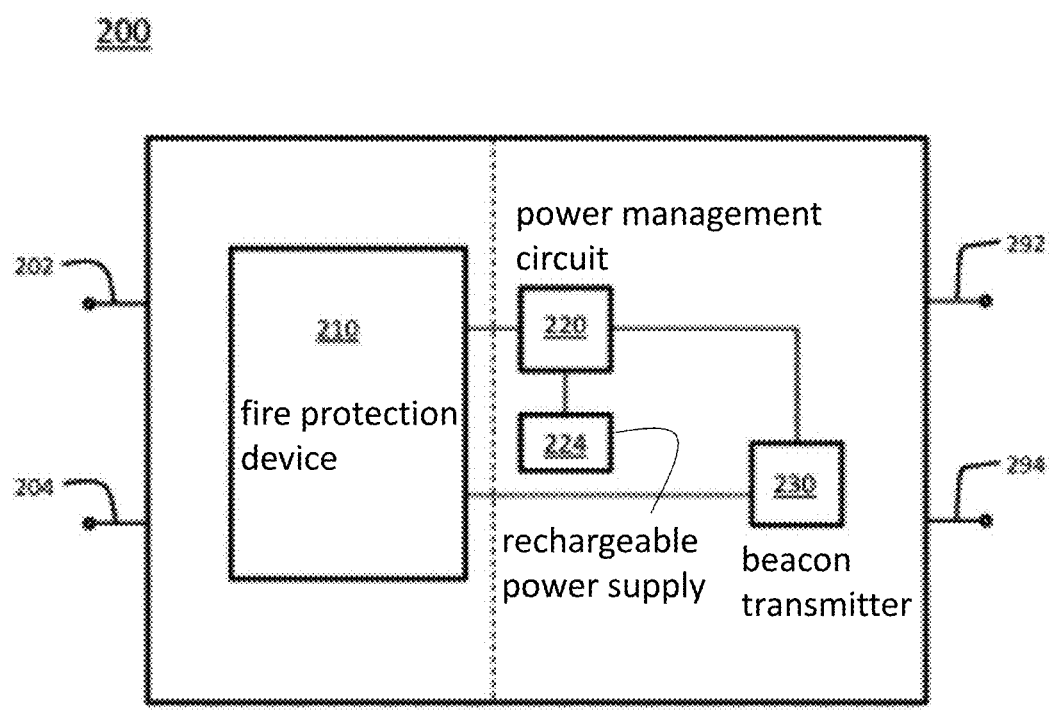
FIG. 2 is a block diagram illustrating an exemplary device within a loop of devices.

With reference to FIG. 2, an exemplary device 200 is illustrated. Device 200 can be any one of devices 120, 122, 124, 126, and 128. Device 200 receives power in the form of positive power terminal 202 and negative power terminal 204. Because device 200 is typically used in a loop configuration (see FIG. 1), device 200 receives power from a control panel or from another device in the loop via positive power terminal 202 and negative power terminal 204. Device 200 also includes positive power terminal 292 and negative power terminal 294. Terminals 292 and 294 are used to couple device 200 to the next device in the loop (or to the control panel.)

Device 200 includes a traditional fire protection device 210. As described above, a traditional fire protection device can include one of a variety of different devices, such as sirens, visual indicators, lighting, detectors, and the like. Coupled to fire protection device 210 is a power management circuit 220. Coupled to power management circuit 220 is a rechargeable power supply 224. Rechargeable power supply 224 can be a rechargeable battery, capacitor, or the like. The operation of power management circuit and rechargeable power supply 224 will be set forth in greater detail below. Also coupled to power management circuit 220 is beacon transmitter 230. Beacon transmitter 230 includes the transmitter and associated circuitry used to transmit wireless signals in one or more of a variety of different formats.

The operation of power management circuit 220 and rechargeable power supply 224 is optimized to lengthen the life span of rechargeable power supply 224 and to provide sufficient power to beacon transmitter 230 (a low-voltage system might not have enough power to run a beacon at all times). In some embodiments, power management circuit 220 is arranged to cycle rechargeable power supply 224 on and off (or from a low-power state to a high power state). For example, once every five seconds, power management circuit 220 is arranged to supply power to beacon transmitter 230. After the beacon period is over, beacon transmitter 230 is switched off (or to a low-power mode). Thus, power can be directed to rechargeable power supply 224 for charging purposes. In some embodiments, a duty cycle is chosen such that rechargeable power supply 224 requires no replacement.

The information transmitted by beacon transmitter 230 can be used in a variety of different manners. In some embodiments, a software application (or "app") is loaded onto a mobile electronic device, such as a smartphone, tablet, smart watch, and the like. Each beacon transmits unique location information. The app on a mobile electronic device senses the unique location information and can thus be used to determine the location of the mobile electronic device. In some embodiments, the unique location information is broadcast via WiFi signals.

The app can then be combined with a map of the building such that the app can display the location on an image of the map. The image can be dynamic and/or interactive such that a user can zoom in or out on the map or move the map to find a location within the building. In a multi-floor building, the location information can include the floor on which the mobile electronic device is located. Thereafter, the map of the appropriate floor of the building can be determined and displayed.

In some embodiments, the unique location information is not contained within the beacon signal. In such an embodiment, the beacon signal might only contain unique identification information about which device contains the beacons. In such an embodiment, the beacon signal does not need to be in communication with the control panel, only using the loop to receive power. In such an embodiment, the app on the mobile electronic device translates the unique identification information into a location. For example, each device can be assigned a unique identifier (such as a globally unique identifier (GUID)). The mobile electronic device receives the unique identifier information. The app can access information regarding the location of each unique identifier. The app can then translate the unique identifier information into a location, which can then be displayed on a map.

In some embodiments, the beacon is capable of receiving signals in addition to sending signals. In such an embodiment, a system can track a position of each user, utilizing a unique identifier transmitted by the user's mobile electronic device. This can be very useful in an emergency situation. For example, in the case of a fire or other emergency in which people have to be evacuated, by tracking the position of each user, one can determine if anyone remains in the building. Thereafter, firefighters or other first responders can be notified as to their presence.

In some embodiments, other information can be pushed to the users. In the case of an emergency, notifications can be sent to each user's mobile electronic device, warning each user of the nature of the emergency. In an embodiment in which the system can determine the location of each user, the system can also send directions to each user, directing the user to the closest emergency exit. If the system cannot determine the location of each user, the app can display a map with the closest exit, enabling each user to determine the safest mode of exit.

In some embodiments, the location of the user can be used for revenue generation purposes. In one example, based on the location of the user, the user can be shown advertisements for an entity. In a shopping mall or an airport, a user can receive an advertisement or a coupon for a retailer based on the user's proximity to the retailer.

In some embodiments, the app can be linked to elevator controls. In such an embodiment, the app can suggest a destination floor for the user and transmit such information to elevator control.

Figure 3:
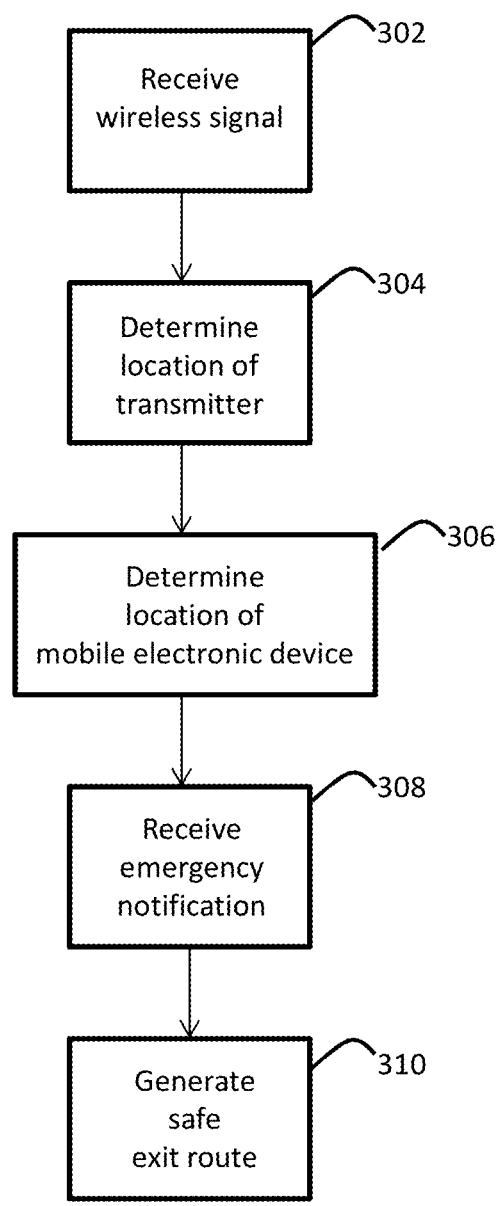
FIG. 3 is a flow diagram illustrating the operation of an exemplary embodiment.

With respect to FIG. 3, a method 300 is presented that illustrates the operation of one or more embodiments. Method 300 is merely exemplary and is not limited to the embodiments presented herein. Method 300 can be employed in many different embodiments or examples not specifically depicted or described herein. In some embodiments, the procedures, processes, and/or activities of method 300 can be performed in the order presented. In other embodiments, one or more of the procedures, processes, and/or activities of method 300 can be combined, skipped, or performed in a different order.

A mobile electronic device receives a wireless signal from a beacon transmitter (block 302). The beacon transmitter may be located within a fire control loop, as described above with respect to FIGS. 1 and 2.

The wireless signal contains information that allows the mobile electronic device to determine the location of the beacon transmitter (block 304). As described above, there can be a variety of ways in which location information can be determined. For example, each beacon transmitter can contain a unique identifier. When the mobile electronic device receives the wireless signal, it can receive the unique identifier. The mobile electronic device can then consult pre-entered information that associates each unique identifier with a location of the beacon transmitter. In other embodiments, the wires signal includes location information directly.

After determining the location of the beacon transmitter, the location of the mobile electronic device can be estimated (block 306). This can occur in one of a variety of different manners. For example, the mobile electronic device can receive location information from multiple beacon transmitters. Using the information from the multiple beacon transmitters, an estimate of the location of the mobile electronic device can be calculated.

An emergency notification can be received via the wireless signal (block 308). Thereafter, the mobile electronic device can perform one of a variety of different tasks to help guide the user of the mobile electronic device to safety. For example, an alert can be generated. The alert can be audible or tactile or any combination thereof. A visual indication can be generated to inform the user of the emergency. Of course, fire alarms, both audible and visual, might be activated within the building in which the fire control system is present.

Thereafter, a route can be generated to guide the user to a safe destination (block 310). For example, a map can be generated and shown to the user. Arrows can be shown on the map that illustrates where the user should go in the case of an emergency. In some embodiments, first person directions can be generated. For example, arrows can be shown on the screen that illustrate a direction that will lead to safety. In some embodiments, augmented reality features can be implemented. In some embodiments, a camera of the mobile electronic device can be used to generate an image of where the user is. Thereafter, arrows or other directional information can be shown on the screen to direct the user to safety.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for indoor localization comprising:
a control panel;
a plurality of devices coupled to the control panel via a low-voltage wiring loop; wherein:
   each device of the plurality of devices includes a beacon transmitter configured to wirelessly transmit information for indoor localization purposes;
wherein each device of the plurality of devices further comprises:
a power management circuit coupled to the beacon transmitter and to the low-voltage wiring loop; and
a rechargeable power supply coupled to the power management circuit; wherein:
   the power management circuit is configured to alternate between powering the beacon transmitter and charging the rechargeable power supply using a duty cycle.

2. The system of claim 1 wherein:
each device of the plurality of devices is part of a fire protection system.

3. The system of claim 2 wherein:
each device of the plurality of devices is chosen from one or more of the following: audio alarm, visual alarm, smoke detector, heat detector, carbon monoxide detector, pull station, and emergency lighting.

4. The system of claim 1 wherein:
the duty cycle comprises powering the beacon transmitter such that the beacon transmitter is capable of transmitting wireless signals, for a first period of time; and
charging the rechargeable power supply for a second period of time; wherein the second period of time is longer than the first period of time.

5. The system of claim 1 wherein:
the information for indoor localization purposes includes unique identification information.

6. The system of claim 1 wherein:
the unique identification information is associated with a location of the beacon transmitter.

7. The system of claim 1 wherein:
the information for indoor localization purposes includes information regarding a location of the beacon transmitter.

8. The system of claim 1 wherein:
the beacon transmitter is configured to transmit signals using a wireless protocol.

9. A method for indoor localization in a fire protection system including a plurality of devices coupled to a control panel via a low-voltage wiring loop, each device of the plurality of devices including a beacon transmitter configured to wirelessly transmit information for indoor localization purposes, the method comprising:
receiving, at a mobile electronic device, a wireless signal from the beacon transmitter from at least one of the plurality of devices;
using information in the wireless signal to determine a location of the beacon transmitter; and
using the location of the beacon transmitter to estimate a location of the mobile electronic device;
wherein each device of the plurality of devices further comprises:
a power management circuit coupled to the beacon transmitter and to the low-voltage wiring loop; and
a rechargeable power supply coupled to the power management circuit;
wherein the power management circuit is configured to alternate between powering the beacon transmitter and charging the rechargeable power supply using a duty cycle.

10. The method of claim 9 wherein:
using information in the wireless signal to determine a location of the beacon transmitter comprises determining a unique identifier within the wireless signal and associating the unique identifier with a location.

11. The method of claim 9 wherein:
using information in the wireless signal to determine a location of the beacon transmitter comprises receiving location information within the wireless signal.

12. The method of claim 9 further comprising:
receiving an emergency notification from the fire protection system within the wireless signal; and
determining a safe path for a user of the mobile electronic device to take based on the location of the mobile electronic device.

13. The method of claim 9 further comprising:
receiving advertisements via the mobile electronic device, wherein the advertisements are customized based on the location of the mobile electronic device.

14. The method of claim 9 further comprising:
displaying a map on the mobile electronic device with an indication of the estimated location of the mobile electronic device.

15. The method of claim 9 wherein:
the mobile electronic device is configured to receive signals using a wireless protocol.

16. The method of claim 9 further comprising:
transmitting information regarding an identity of the mobile electronic device to allow tracking of the mobile electronic device.

17. The method of claim 9 further comprising:
receiving a notification of an emergency via the mobile electronic device;
generating directions for exiting the emergency situation, using the location of the mobile electronic device; and
displaying the directions via the mobile electronic device.

18. The method of claim 17 wherein:
displaying the directions comprises using augmented reality features to display the directions.

* * * * *